(12) United States Patent
Ohsato et al.

(10) Patent No.: US 7,490,524 B2
(45) Date of Patent: Feb. 17, 2009

(54) FORCE SENSOR CHIP

(75) Inventors: Takeshi Ohsato, Wako (JP); Nobuhiro Sakurai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/882,327

(22) Filed: Jul. 31, 2007

(65) Prior Publication Data

US 2008/0034897 A1 Feb. 14, 2008

(30) Foreign Application Priority Data

Aug. 8, 2006 (JP) ............... P2006-216143

(51) Int. Cl.
*G01L 1/04* (2006.01)
(52) U.S. Cl. ................................ 73/862.629
(58) Field of Classification Search ............ 73/861.041, 73/862.042, 862.044, 862.045
See application file for complete search history.

(56) References Cited

U.S. PATENT DOCUMENTS 6,951,142 B2 * 10/2005 Ohsato et al. .......... 73/862.041

FOREIGN PATENT DOCUMENTS

JP 2003-207405 A 7/2003

OTHER PUBLICATIONS

U.S. Appl. No. 11/889,438.*

* cited by examiner

*Primary Examiner*—Jewel Thompson
(74) *Attorney, Agent, or Firm*—Birch, Stewart, Kolasch & Birch, LLP

(57) ABSTRACT

In a force sensor chip, a base member, to which an external force is applied, includes: an operating part provided in a central portion of the base member and having an external-force acting area section; a supporting part provided, in an outer peripheral portion of the base member, for supporting the operating part; an intermediate part provided between the operating part and the supporting part; a first connecting arm section connecting the operating part and the intermediate section; a second connecting arm section connecting the intermediate part and the supporting part; and at least one strain resistance element provided on each of respective deformation-generating portions of the first and the second connecting arm sections.

17 Claims, 5 Drawing Sheets

FIG.8
(PRIOR ART)

| | Fx | Fz | My | Mz |
|---|---|---|---|---|
| (1) APPLIED AXIAL FORCE | | | | |
| (2) DEFORMATION PATTERN | | | | |
| (3) MATHEMATICAL EXPRESSION FOR DETERMINING STRAIN | $((R21-R23)+(R43-R41))/4$ | $-(R12+R22+R32+R42)/4$ | $(R12-R32)/2$ | $((R13-R11)+(R23-R21)+(R33-R31)+(R43-R41))/8$ |

FORCE SENSOR CHIP

FIELD OF THE INVENTION

The present invention relates generally to force sensor chips, and more particularly to an improved force sensor chip which has a plurality of strain resistance elements formed on a substrate using semiconductor manufacturing technology and which is suitable for use a six-axis force sensor or other device in an industrial robot or the like.

BACKGROUND OF THE INVENTION

As known in the art, automated working machines, such as machine tools and industrial robots, apply forces to workpieces and are themselves subjected to external forces because of the manner in which these machines operate. In this case, it is necessary for the working machines to detect external forces and moments applied to the machines and to perform control corresponding to the detected external forces and moments. In order to perform the control, corresponding to the detected external forces and moments, with a high degree of precision, it is required to accurately detect the external forces and moments.

In view of this situation, various types of force sensors have been proposed to date. Generally, the force sensors can be classified, according to the detection scheme employed, into elastic-type force sensors and equilibrium-type force sensors. The elastic-type force sensors measure a force on the basis of an amount of deformation proportional to the external force, while the equilibrium-type force sensors measure a force by balancing it with a known force.

Also known are force sensors whose structure is based on the principle that a plurality of strain resistance elements are provided in parts of a strain-generating body that is elastically deformable in response to an external force applied thereto. When an external force is applied to the strain-generating body of the force sensor, electrical signals corresponding to the degree of deformation (stress) of the strain-generating body are output from the plurality of strain resistance elements. Forces that have two or more components and are applied to the strain-generating body can be detected on the basis of these electrical signals, and a stress produced in the force sensor is calculated on the basis of the electrical signals.

Among examples of the conventionally-known elastic-type force sensors are six-axis force sensors, each of which includes a plurality of strain resistance elements provided in parts of a strain-generating body. The six-axis force sensors divide an external force applied thereto into stress components (i.e., forces Fx, Fy, Fz) in respective axial direction of three axes (i.e., X-axis, Y-axis and Z-axis) of an orthogonal coordinate system and into torque components (i.e., moments Mx, My, Mz) about the respective axes, and it detects the external force as six axis components.

The inventors of the present invention etc. proposed a six-axis force sensor, having a novel construction, in Japanese Patent Laid-Open Publication No. 2003-207405. This proposed six-axis force sensor can provide a solution to the problem of interference from other axes (i.e., inter-axis interference problem) that prevents individual components (i.e., forces and moments) of an external force, applied to the strain-generating body, from being accurately separated from one another or resolved with good precision. In the proposed six-axis force sensor, a plurality of strain resistance elements are integrally assembled in a predetermined arrangement or layout pattern in parts of a strain-generating body on a semiconductor substrate by using semiconductor manufacturing processing. The proposed six-axis force sensor is formed using the semiconductor substrate of a substantially square planar shape, which includes: a supporting part located in an outer peripheral portion of the semiconductor substrate, an operating part located in a central portion of the semiconductor substrate and having a substantially square shape, and connecting parts connecting the four side of the square operating part and corresponding portions of the supporting part. The strain resistance elements are provided on boundary areas between the individual sides of the square operating part and the connecting parts. The proposed six-axis force sensor is arranged to solve the "inter-axis interference" problem through an improvement in the configuration of parts of the strain-generating body and optimization of the layout pattern of the plurality of strain resistance elements.

However, the six-axis force sensor proposed or disclosed in the No. 2003-207405 publication would present the following problem. Namely, when a force Fz is applied in the Z-axis direction to the operating part of the semiconductor substrate of the disclosed six-axis force sensor, the operating part is displaced and deforms in the Z-axis direction. In this case, individual terms of a mathematical expression for calculating a sensor output value responsive to the application of the force have the same sign (polarity), and thus, the sensor output value will be determined through same-polarity arithmetic operations.

FIG. 8 shows one example of a detection scheme, disclosed in the No. 2003-207405 publication, for detecting magnitude values and directions of six axial forces when an external force has been applied to the six-axis force sensor. To facilitate understanding, FIG. 8 shows deformation patterns 131 and deformation states in an exaggerated fashion. Any one or combination of six axial forces is applied, as an external force, to the operating part 121 of the force sensor chip 111. The operating part 121, to which an axial force has been applied, changes its position while being supported by the peripheral supporting part 122 and four connecting parts connecting the operating part 121 and peripheral supporting part 122. As a consequence, specific deformations, corresponding to the applied axial forces, are produced in the four connecting parts, and specific detection signals corresponding to the deformations are output via the strain resistance elements R11-R43.

More specifically, (1) of FIG. 8 shows axial forces Fx, Fz, My, Mz applied to the operating part 121, (2) of FIG. 8 shows deformation patterns of the force sensor chip 111 responsive to the applied axial forces Fx, Fz, My, Mz, and (3) of FIG. 8 shows mathematical expressions for determining strain characteristic of the applied axial forces Fx, Fz, My, Mz. As the deformation patterns of the force sensor chip 111, there are shown, in (3) of FIG. 8, a deformation pattern 131 in a planar shape and deformation pattern 132 in a vertical sectional shape. The mathematical expressions will also be referred to as "resistance-increase/decrease-value determining mathematical expressions".

R11, R12, R13, R21, R22, R23, R31, R32, R33, R41, R42 and R43, used in the resistance-increase/decrease-value determining mathematical expressions shown in (3) of FIG. 8, represent resistance change amounts of corresponding ones of twelve strain resistance elements.

As shown in FIG. 8, the axial force Fx is applied as indicated by arrow 133, in response to which a detection signal, determined by the mathematical expression of "((R21−R23)+ (R43−R41))/4", is provided as a prominent output signal. The axial force Fz is applied as indicated by arrow 134, in response to which a detection signal, determined by the mathematical expression of "−(R12+R22+R32+R42)/4", is provided as a prominent output signal. The axial force My is applied as indicated by arrow 135, in response to which a detection signal, determined by the mathematical expression of "(R12−R32)/2", is provided as a prominent output signal. Further, the axial force Mz is applied as indicated by arrow 136, in response to which a detection signal, determined by the mathematical expression of "((R13−R11)+(R23−R21)+(R33−R31)+(R43−R41))/8", is provided as a prominent output signal. By performing appropriate arithmetic operations (e.g., well-known matrix operations) on these detection signals, it is possible to identify the axial forces applied to the six-axis force sensor.

With the conventional force sensor chip disclosed in the No. 2003-207405 publication, only when the sensor output value of the axial force Fz is calculated or determined, the individual terms of the mathematical expression have the same sign, and thus, the sensor output value is determined through same-polarity arithmetic operations, as noted above.

Namely, in the case of application of the force Fz, the resistance elements in the force sensor, disclosed in the No. 2003-207405 publication, present element output changes of the same polarity, so that the arithmetic operations for determining a sensor output (i.e., sensor output determining arithmetic operations) comprise only additions. Consequently, when noise has been produced, the noise can not be canceled, which would become a cause that produces an unwanted drift noise component in an output signal of the sensor.

SUMMARY OF THE INVENTION

In view of the foregoing prior art problems, it is an object of the present invention to provide an improved force sensor chip which can cancel noise through sensor output determining arithmetic operations, minimize drift noise and thereby achieve stable, highly-precise force and moment detection.

In order to accomplish the above-mentioned object, the present invention provides an improved force sensor chip, which comprises: a base member to which an external force is applied, the base member including: an operating part provided in a central portion of the base member and having an external-force acting area section; a supporting part provided, in an outer peripheral portion of the base member, for supporting the operating part; an intermediate part provided to extend from near an outer periphery of the operating part to near an inner peripheral portion of the supporting part; a first connecting arm section connecting the operating part and the intermediate section; and a second connecting arm section connecting the intermediate part and the supporting part; and at least one strain resistance element provided on each of respective deformation-generating portions of the first connecting arm section and second connecting arm section.

The force sensor chip arranged in the aforementioned manner can calculate all of axial forces, including the one applied in a direction orthogonal to the operating part, on the basis of element outputs (resistance value changes of the strain resistance elements) of different polarities, and thus, it can effectively reduce drift noise in an output signal of the sensor. Further, because the strain elements etc. are provided on one surface of the chip base member (e.g., semiconductor substrate) with novel constructions of the connecting arm sections and novel layout pattern of the resistance elements, the processing for fabricating the base member (e.g., semiconductor substrate) of the force sensor chip can be significantly simplified, and the force sensor chip can be implemented with ease.

BRIEF DESCRIPTION OF THE DRAWINGS

Certain preferred embodiments of the present invention will hereinafter be described in detail, by way of example only, with reference to the accompanying drawings, in which:

FIG. 8 is a diagram explanatory of problems presented by a conventional force sensor chip.

DETAILED DESCRIPTION OF THE PREFERRED EMBODIMENTS

Now, with reference to FIGS. 1-6, a description will be given about a force sensor chip in accordance with an embodiment of the present invention. The instant embodiment of the force sensor chip will be described hereinbelow as being in the form of a six-axis force sensor chip, although the present invention is not limited to a six-axis force sensor chip.

Figure 1:
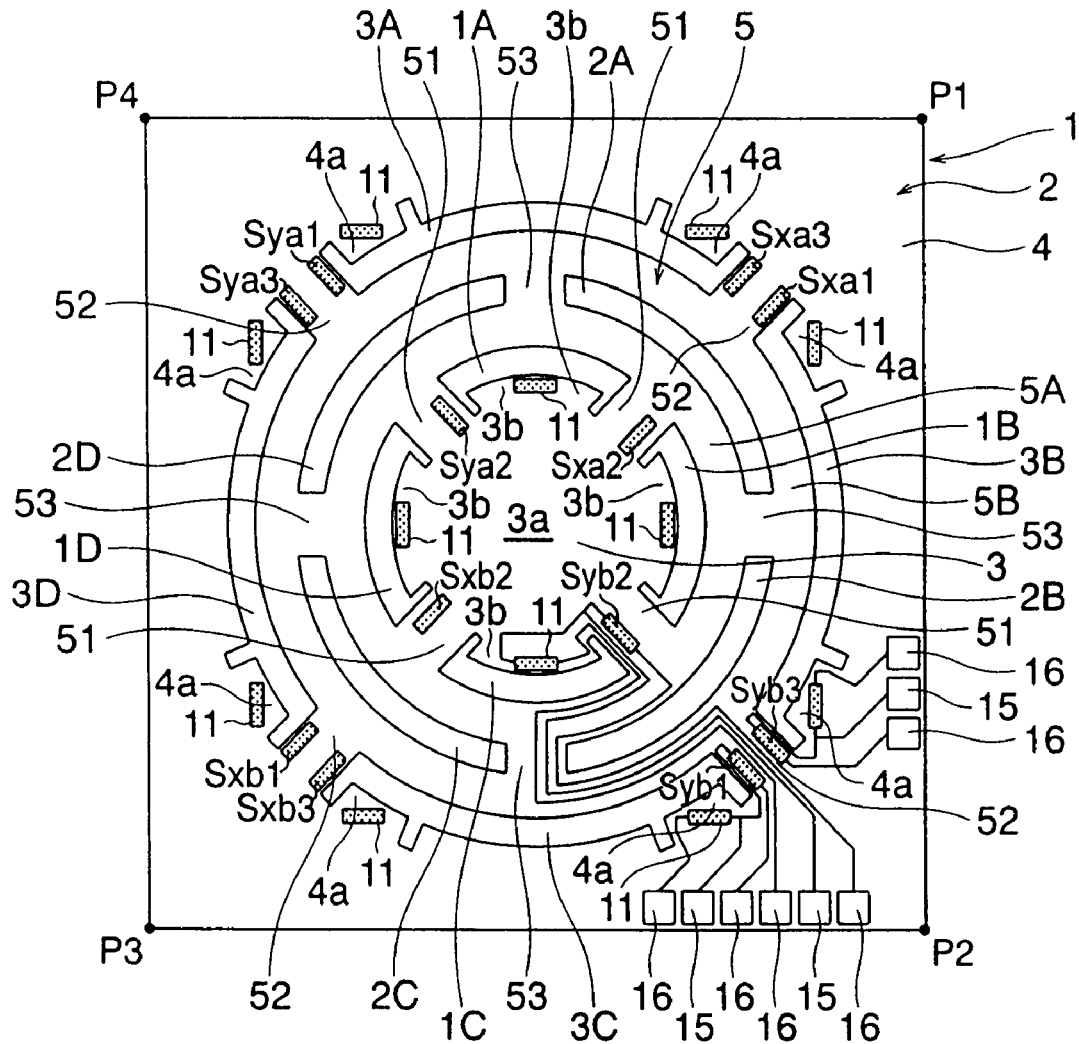
FIG. 1 is a plan view showing an embodiment of a force sensor chip of the present invention.

FIG. 1 is a plan view showing one surface (i.e., front surface) of the force sensor chip 1, which particularly shows all of a plurality of strain resistance elements and temperature compensating resistance elements, a plurality of arcuate elongated holes and some of electric wiring patterns and electrode pads forming a fundamental construction of the force sensor chip.

As shown in FIG. 1, the force sensor chip 1 is formed using a base member 2 that is a semiconductor substrate preferably having a substantially square plate shape as viewed in plan. Although the base member 2 will hereinafter be described as being a semiconductor substrate, it is not limited to a semiconductor substrate. Because of the semiconductor substrate 2 having a substantially square planar shape, the force sensor chip 1 has a plate shape as a whole.

In the case where the base member 2 is a semiconductor substrate, the square semiconductor substrate is provided with the planar shape, predetermined holes are formed and the semiconductor substrate itself is processed preferably, by applying, to the one surface (front surface) thereof, semiconductor manufacturing technology (e.g., resist patterning and etching process, such as photolithography, ion implantation, and film-forming process, such as p-CVD (plasma Chemical Vapor Deposition), sputtering or RIE (Reactive Ion Deposition)), and the sensor chip 1 is manufactured by performing film-forming on a predetermined area of the one surface of the semiconductor substrate.

Thus, the force sensor chip 1 according to the instant embodiment is formed as a semiconductor sensor device.

In the force sensor chip 1, a function section for detecting six axis components as a six-axis force sensor comprises a total of twelve strain resistance elements or piezoelectric resistance elements (hereinafter referred to as "resistance elements") Sxa1, Sxa2, Sxa3, Sxb1, Sxb2, Sxb3, Sya1, Sya2, Sya3, Syb1, Syb2, Syb3 composed of active layers (or thermal diffusion layers) formed by ion implantation in the front surface of the semiconductor substrate 2. The twelve resistance elements are disposed, as sets of three elements (Sxa1, Sxa2, Sxa3), (Sxb1, Sxb2, Sxb3), (Sya1, Sya2, Sya3) and (Syb1, Syb2, Syb3), on respective ones of four connecting regions as will be later described.

The force sensor 1 further includes temperature compensating resistance elements 11, each formed of an active layer (thermal diffusion layer), provided in corresponding relation to the twelve resistance elements Sxa1-Sxa3, Sxb1-Sxb3, Sya1-Sya3 and Syb1-Syb3. These temperature compensating resistance elements 11 are disposed on non-deforming area sections as will be later described. Although the resistance elements Sxa1-Sxa3, Sxb1-Sxb3, Sya1-Sya3 and Syb1-Syb3 and the temperature compensating resistance elements 11 are each in the form of a strain resistance element, the resistance elements Sxa1-Sxa3, Sxb1-Sxb3, Sya1-Sya3 and Syb1-Syb3 function as detecting elements, while the temperature compensating resistance elements 11 function as reference elements.

As shown in FIG. 1, the semiconductor substrate 2 has a total of 12 arcuate elongated holes 1A, 1B, 1C, 1D, 2A, 2B, 2C, 2D, 3A, 3B, 3C and 3D formed through the thickness of the plate-shape substrate 2. With these arcuate elongated holes 1A, 1B, 1C, 1D, 2A, 2B, 2C, 2D, 3A, 3B, 3C and 3D, the force sensor chip 1 is functionally separated into a plurality of areas.

Each of the arcuate elongated holes 1A, 1B, 1C, 1D, 2A, 2B, 2C, 2D, 3A, 3B, 3C and 3D is of a slit-like shape having a relatively small width. Of these arcuate elongated holes (slits), the four similarly-shaped arcuate elongated holes 1A, 1B, 1C and 1D together constitute an innermost substantially-circular hole, the four similarly-shaped arcuate elongated holes 3A, 3B, 3C, 3D together constitute an outermost substantially-circular hole, and the other four similarly-shaped arcuate elongated holes 2A, 2B, 2C, 2D together constitute an intermediate substantially-circular hole. The innermost, intermediate and outermost circular holes, formed by the arcuate holes 1A-1D, 2A-2D and 3A-3D, are positioned in concentric relation to one another. The innermost arcuate holes 1A, 1B, 1C and 1D and the outermost arcuate holes 3A, 3B, 3C and 3D are formed in corresponding angular positions along their respective circumferential directions. The intermediate arcuate holes 2A, 2B, 2C and 2D are formed in angular positions displaced circumferentially by 45° from the innermost arcuate holes 1A, 1B, 1C and 1D and outermost arcuate holes 3A, 3B, 3C and 3D.

With the arcuate elongated holes 1A, 1B, 1C, 1D, 2A, 2B, 2C, 2D, 3A, 3B, 3C, 3D formed in the aforementioned manner, the semiconductor substrate 2, forming the chip 1, includes three major parts: an operating part 3 having a substantially-circular planar shape and located in a central portion of the semiconductor substrate 2; a supporting part 4 with its inner circular periphery having a substantial ring shape and surrounding the operating part 3; and a connecting (bridge) part 5 connecting the operating part 3 and the supporting part 4.

Further, with the arcuate elongated holes 1A, 1B, 1C, 1D, 2A, 2B, 2C, 2D, 3A, 3B, 3C, 3D formed in the aforementioned manner, the connecting part 5 includes: a first annular intermediate section 5A disposed around the operating part 3; a second annular intermediate section 5B disposed outwardly around the first annular intermediate section 5A; four first connecting arm sections 51 disposed at equal angular intervals and connecting the operating part 3 and the first annular intermediate section 5A; four second connecting arm sections 52 disposed at equal angular intervals and connecting the supporting part 4 and the second annular intermediate section 5B; and four third connecting arm sections 53 disposed at equal angular intervals and connecting the first annular intermediate section 5A and the second annular intermediate section 5B.

In the semiconductor substrate 2, the peripheral or surrounding supporting part 4 is a part that is supported, for example, from below by a support base as it is assembled into a six-axis force sensor unit. Further, the operating part 3 is a part that is directly subjected to (i.e., directly receives) an external force, load or the like (hereinafter referred to as "external force") when such an external force is transmitted to the substrate 2 via a connecting rod; the operating part 3 is constructed so that its central section receives an external force. The first connecting arm sections 51 and second connecting arm sections 52 are deforming sections (strain-generating sections) that, when deformation and positional variation occurs in the operating part 3 due to an external force applied to the operating part 3, notably deform and positionally vary in response to the deformation and positional variation in the operating part 3; the greatest stress occurs in the deforming sections among the supporting part, operating part, connecting part, etc.

The operating part 3 includes the central section (external-force acting area section) 3a to which an external force is applied or input, and four non-deforming area sections 3b disposed outwardly around the central section 3a. The connecting rod for transmitting an external force etc. is connected to the central section 3a. Inward grooves are formed at opposite ends of each of the arcuate holes 1A, 1B, 1C and 1D so that the non-deforming area section 3b is formed, inwardly of each of the holes 1A, 1B, 1C and 1D, as a free end portion of the operating part 3. The four non-deforming area sections 3b themselves do not deform even when an external force has been applied to the central section 3a. The above-mentioned temperature compensating resistance elements 11 are disposed utilizing these four non-deforming area sections 3b.

As noted above, the connecting part 5 located outwardly around the operating part 3 includes the first annular intermediate section 5A, second annular intermediate section 5B, four first connecting arm sections 51, four second connecting arm sections 52, and four third connecting arm sections 53. Each of the four first connecting arm sections 51 and one of the four second connecting arms 52 which corresponds to the first connecting arm section 51 are formed in the same angular positions along their respective circumferential directions; that is, the first and second connecting arm sections 51 and 52 are radially aligned with each other. Further, the four third connecting arm sections 53 are displaced circumferentially by 45 degrees from corresponding ones of the first connecting arm sections 51 and second connecting arm sections 52.

Outward grooves are formed at opposite ends of each of the holes 3A, 3B, 3C and 3D, formed along the inner circumferential edge of the supporting section 4, so that non-deforming areas 4a are at opposite sides of the second connecting arm sections 52. The temperature compensating resistance elements 11 are disposed utilizing these four non-deforming areas 4a.

The strain resistance elements, first and second connecting arm sections and intermediate parts are formed in quadruple symmetry about the center of the semiconductor substrate.

In FIG. 1, the resistance elements Syb1, Syb2 and Syb3 and the three temperature compensating resistance elements 11 corresponding thereto, for example, are disposed utilizing the first and second connecting arm sections 51 and 52 located in a lower right region of the connecting part 5 of the semiconductor substrate 2. In FIG. 1, four corner points of the semiconductor substrate 2 having a square planar shape are indicated by P1, P2, P3 and P4, and the resistance elements Syb1, Syb2 and Syb3, etc. are disposed on the first and second connecting arm sections 51 and 52 located in a corner area corresponding to the corner point P2.

The resistance elements Syb1, Syb2 and Syb3 and the three temperature compensating resistance elements 11 corresponding to the resistance elements Syb1, Syb2 and Syb3 are disposed in the following layout pattern. The resistance element Syb2 is formed on the surface of the first connecting arm section 51, and the two resistance elements Syb1 and Syb3 are formed on the surface of the second connecting arm section 52. The resistance elements Syb1, Syb2 and Syb3 each have a length oriented in a diagonal direction of the semiconductor substrate 2. The temperature compensating resistance element 11 corresponding to the resistance element Syb2 is formed on one of the non-deforming area sections 3b, and the temperature compensating resistance elements 11 corresponding to the resistance elements Syb1 and Syb3 are formed on one of the non-deforming areas 4a.

Electric wiring patterns for the resistance elements Syb1, Syb2 and Syb3 and three temperature compensating resistance elements 11 corresponding to the resistance elements Syb1, Syb2 and Syb3 are constructed as follows.

Figure 2:
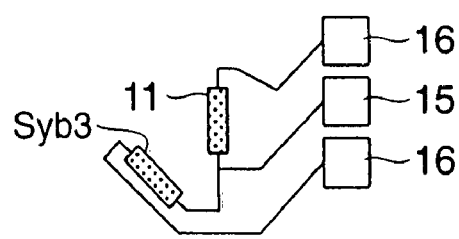
FIG. 2 is an electric circuit diagram showing an electric wiring pattern for one strain resistance element located near an outer periphery of the force sensor chip of FIG. 1 and a temperature compensating resistance element corresponding to the one strain resistance element.

The electric wiring patterns for the resistance elements Syb1 and Syb3 and temperature compensating resistance elements 11 corresponding thereto have a structure that forms a half-bridge circuit as shown in FIG. 2. Whereas it is common to build a full-bridge circuit in a force sensor chip, external resistors may be added to a half-bridge circuit to construct a full-bridge circuit as a whole. The instant embodiment employs such a construction where external resistors are added to a half-bridge circuit to construct a full-bridge circuit as a whole. FIG. 2 shows in enlarged scale the electric wiring pattern for the resistance element Syb3, which is exactly the same as the electric wiring pattern for the resistance element Syb3 shown in FIG. 1. In FIG. 2, a connection point between one ends of the resistance element Syb3 and corresponding temperature compensating resistance element 11 is connected to a GND electrode pad 15, and the other ends of the resistance element Syb3 and corresponding temperature compensating resistance element 11 are connected to respective signal electrode pads 16. As shown in FIG. 1, the single GND electrode pad 15 and the two signal electrode pads 16 are arranged along one side of the semiconductor substrate 2. The electric wiring pattern for the resistance element Syb1 is constructed in substantially the same manner as the aforementioned electric wiring pattern for the resistance element Syb3. However, as seen from FIG. 1, the electric wiring pattern for the resistance element Syb1 is disposed in line symmetry with the electric wiring pattern for the resistance element Syb3 about a diagonal line P2-P4 of the semiconductor substrate 2.

Figure 3:
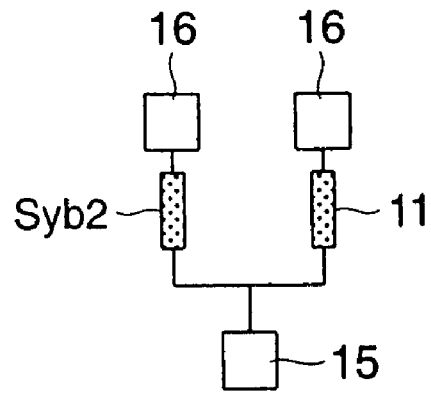
FIG. 3 is an electric circuit diagram showing an electric wiring pattern for another strain resistance element and a temperature compensating resistance element corresponding thereto.

Further, although shown in FIG. 1 as a complicated pattern, the electric wiring pattern for the resistance element Syb2 and temperature compensating resistance element 11 corresponding to the resistance element Syb2 is constructed in substantially the same manner as the aforementioned electric wiring pattern for the resistance element Sby1 or Syb3. Further, FIG. 3 shows the electric wiring pattern for the resistance element Syb2 and temperature compensating resistances element 11 corresponding to the resistance element Syb2, which is constructed in substantially the same manner as the aforementioned electric wiring pattern of FIG. 2. In the half-bridge wiring structure shown in FIG. 3 as well, a connection point between one ends of the resistance element Syb2 and corresponding temperature compensating resistance element 11 is connected to a GND electrode pad 15, and the other ends of the resistance element Syb2 and corresponding temperature compensating resistance element 11 are connected to respective signal electrode pads 16. As shown in FIG. 1, the GND electrode pad 15 and the two signal electrode pads 16 for the resistance element Syb2 are arranged along one side of the semiconductor substrate 2 as seen in FIG. 1.

Figure 4:
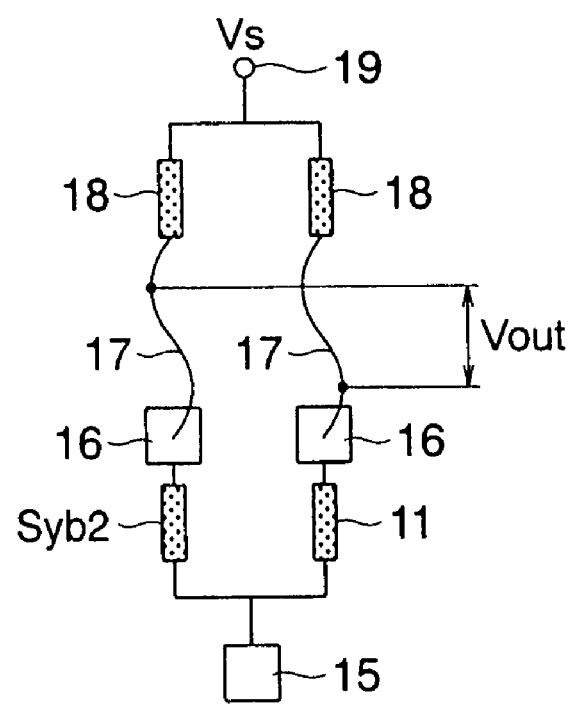
FIG. 4 is an electric circuit diagram showing a full-bridge wiring structure constructed by connecting an external circuit to the electric wiring pattern of FIG. 3.

FIG. 4 shows a full-bridge wiring structure constructed by connecting external wires 17 to the two signal electrode pads 16 of the electric wiring pattern of FIG. 3 and connecting respective one ends of two ceramic-made external resistors 18 to the external wires 17. Power supply voltage Vs is applied to the other ends or terminals 19 of the two ceramic-made external resistors 18. By forming the full-bridge wiring structure of FIG. 4 for each of the resistance elements Syb1, Syb2 and Syb3, a voltage between the two external wires 17 can be taken out as a temperature-compensated output of the resistance element, i.e. element output Vout.

Layout patterns and electric wiring patterns for the other resistance elements Sya1-Sya3, Sxa1-Sxa3 and Sxb1-Sxb3 are the same as the aforementioned layout patterns and electric wiring patterns for the resistance elements Syb1-Syb3 and corresponding temperature compensating resistance elements 11; the layout patterns and electric wiring patterns for the other resistance elements Sya1-Sya3, Sxa1-Sxa3 and Sxb1-Sxb3 only differ in position from the latter.

The resistance elements Sya1, Sya2 and Sya3 and the three temperature compensating resistance elements 11 corresponding thereto are provided utilizing the first and second connecting arm sections 51 and 52 located in a corner area corresponding to the corner point P4 of the semiconductor substrate 2 shown in FIG. 1. The layout patterns and electric wiring patterns for the other resistance elements Sya1-Sya3 and three temperature compensating resistance elements 11 corresponding thereto are constructed in the same manner as the aforementioned layout patterns and electric wiring patterns for the resistance elements Syb1-Syb3 and three temperature compensating resistance elements 11 corresponding thereto. However, in FIG. 1, illustration of electric wiring patterns, GND and signal electrode pads of the resistance elements Sya1-Sya3 and corresponding temperature compensating resistance elements 11 is omitted for simplicity.

Sets of the resistance elements Sya1-Sya3 and resistance elements Syb1-Syb3 are formed along the diagonal line P2-P4 of the semiconductor substrate 2.

The resistance elements Sxa1, Sxa2 and Sxa3 and the three temperature compensating resistance elements 11 corresponding thereto are provided utilizing the first and second connecting arm sections 51 and 52 located in a corner area corresponding to the corner point P1 of the semiconductor substrate 2 shown in FIG. 1. The layout patterns and electric wiring patterns for the other resistance elements Sxa1-Sxa3 and three temperature compensating resistance elements 11 corresponding thereto are constructed in the same manner as the aforementioned layout patterns and electric wiring patterns for the resistance elements Syb1-Syb3 and three temperature compensating resistance elements 11 corresponding thereto. However, in FIG. 1, illustration of electric wiring patterns, GND and signal electrode pads of the resistance elements Sxa1-Sxa3 and corresponding temperature compensating resistance elements 11 is omitted for simplicity.

The resistance elements Sxb1, Sxb2 and Sxb3 and the three temperature compensating resistance elements 11 corresponding thereto are provided utilizing the first and second connecting arm sections 51 and 52 located in a corner area corresponding to the corner point P3 of the semiconductor substrate 2 shown in FIG. 1. The layout patterns and electric wiring patterns for the other resistance elements Sxb1-Sxb3 and three temperature compensating resistance elements 11 corresponding thereto are constructed in the same manner as the aforementioned layout patterns and electric wiring patterns for the resistance elements Syb1-Syb3 and three temperature compensating resistance elements 11 corresponding thereto. However, in FIG. 1, illustration of electric wiring patterns, GND and signal electrode pads of the resistance elements Sxb1-Sxb3 and corresponding temperature compensating resistance elements 11 is omitted for simplicity.

Sets of the resistance elements Sxa1-Sxa3 and resistance elements Sxb1-Sxb3 are formed along the diagonal line P1-P3 of the semiconductor substrate 2.

On the surface of the semiconductor substrate 2 of the force sensor chip 1, as set forth above, there are formed the twelve resistance elements Sxa1-Sxa3, Sxb1-Sxb3, Sya1-Sya3 and Syb1-Syb3, twelve temperature compensating resistance elements 11 and thirty six or more pads in predetermined layout patterns and electric wiring patterns. In the semiconductor substrate 2, the diagonal line P1-P3 is defined as an X-axis direction, and the diagonal line P2-P4 is defined as a Y-axis direction. Further, a direction orthogonal to the surface of the semiconductor substrate 2 is defined as a Z-axis direction.

Further, in the semiconductor substrate 2, the layout of the resistance elements Sxa1-Sxa3, Sxb1-Sxb3, Sya1-Sya3 and Syb1-Syb3 and temperature compensating resistance elements 11 is determined with a crystal orientation of the semiconductor substrate 2 taken into account. Namely, because the silicon wafer surface has a (100) crystal orientation, the long side of each of the resistance elements Sxa1-Sxa3, Sxb1-Sxb3, Sya1-Sya3 and Syb1-Syb3 and the long side of the temperature compensating resistance element 11 corresponding thereto are positioned with a 45° inclination therebetween, in which case the long side of the resistance element has a <110> crystal orientation while the long side of the temperature compensating resistance element 11 has a <100> crystal orientation. In the illustrated example of FIG. 1, the <110> crystal orientation corresponds to the directions of the two diagonal lines of the semiconductor substrate 2, and the <100> crystal orientation corresponds to the directions of the four sides of the semiconductor substrate 2.

With the layout of the elements shown in FIG. 1, the force sensor chip 1 can achieve a high sensitivity even where there is a strain factor difficult to avoid through a particular construction of the semiconductor substrate 2 and particular layout of the elements. Note however that the layout of the elements having been described above in relation to the instant embodiment is only illustrative and the elements may be laid out in any other suitable manner. For example, in a case where there are employed a layout of the elements and a construction of the semiconductor substrate 2 such that the temperature compensating resistance elements 11 are not influenced by resistance of strain, the long sides of the resistance elements Sxa1-Sxa3, Sxb1-Sxb3, Sya1-Sya3 and Syb1-Syb3 and the long sides of the temperature compensating resistance elements 11 corresponding thereto may both be positioned in the <110> orientation of FIG. 1.

The semiconductor substrate 2, forming the instant embodiment of the force sensor chip 1, has a substantially square shape as seen in FIG. 1, and the four first connecting arm sections 51 and four second connecting arm sections 52, on which are formed the resistance elements, are positioned on the diagonal lines of the semiconductor substrate 2. Thus, the length of each of the resistance elements extends in the <110> crystal orientation of the silicon wafer, so that any strain can be detected with a high sensitivity.

Figure 5:
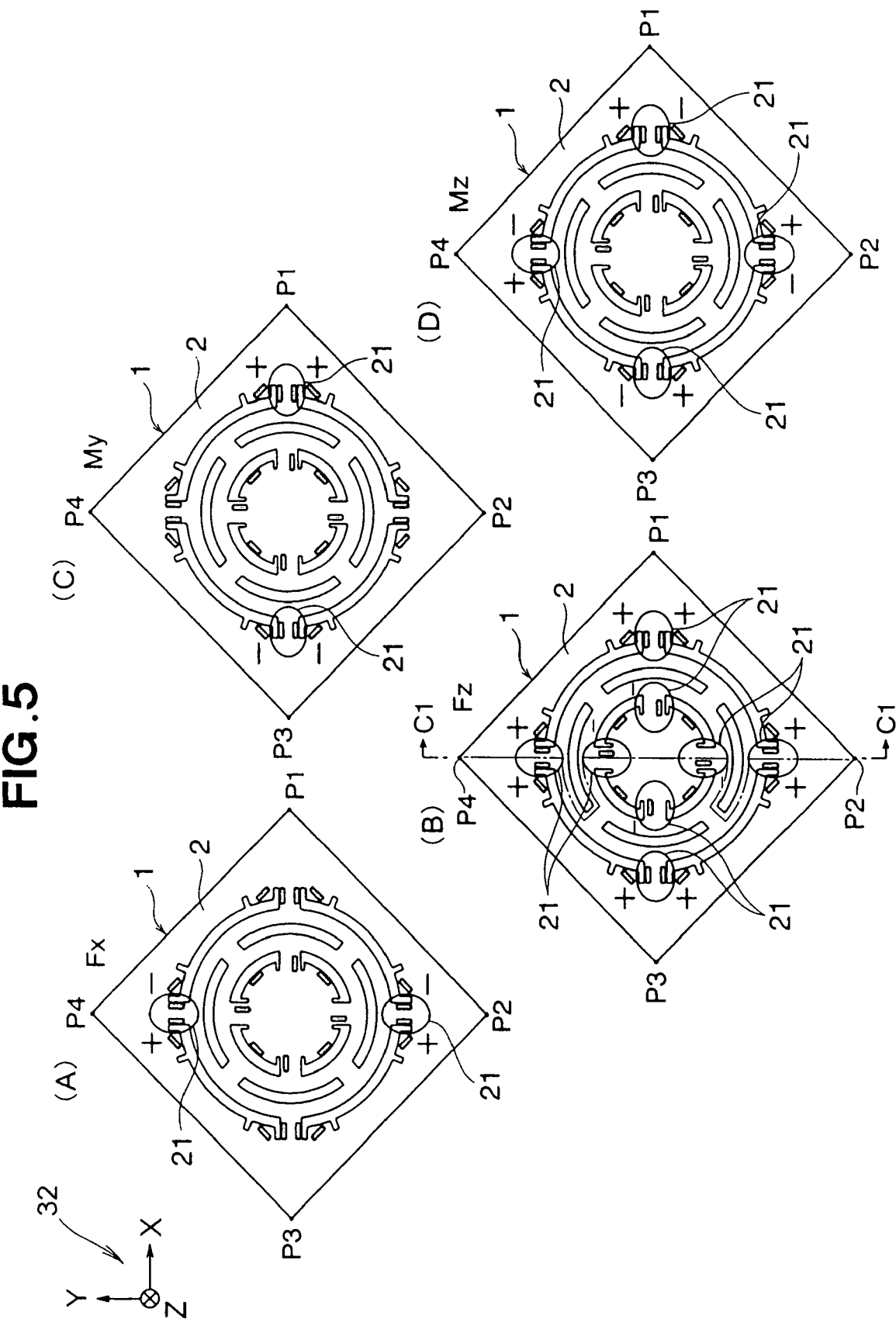
FIG. 5 is a diagram explanatory of detecting operation of the embodiment of the force sensor chip, which particularly shows four detecting axes (Fx, Fz, My, Mz) and twelve strain resistance elements of the force sensor chip.
Figure 6:
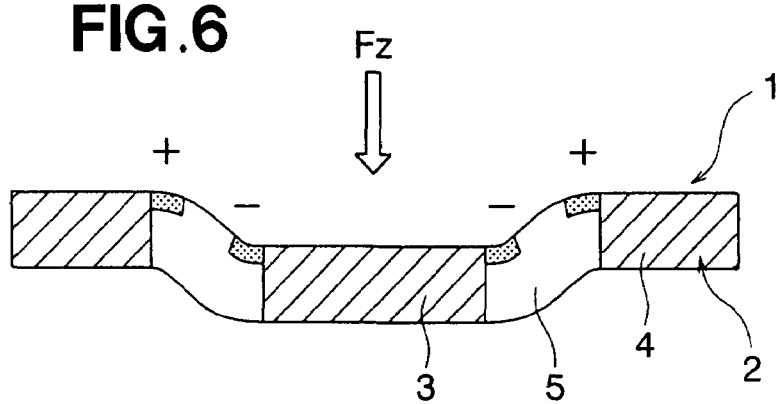
FIG. 6 is a sectional view taken along the C1-C1 line of (B) of FIG. 5, which shows a deformation of the force sensor chip when an external force Fz has been applied.

Next, with reference to FIGS. 5 and 6, a description will be given about operational characteristics of the force sensor chip 1 constructed in the above-described manner. (A) to (D) of FIG. 5 are plan views of the force sensor chip 1, which show four detection axes Fx, Fz, My and Mz and twelve resistance elements. FIG. 6 is a sectional view taken along the C1-C1 line of (B) of FIG. 5, which shows a manner of deformation of the force sensor chip 1 when an external force Fz has been applied.

(A) to (D) of FIG. 5 show four manners of deformation of the force sensor chip 1. In each of (A) to (D) of FIG. 5, the diagonal line P2-P4 (i.e., Y-axis direction) of the force sensor chip 1 is depicted as a vertical direction of the figure, while the diagonal line P1-P3 (i.e., X-axis direction) of the force sensor chip 1 is depicted in a horizontal direction. Specifically, (A) of FIG. 5 shows a state when a force Fx has been applied, (B) of FIG. 5 shows a state when a force Fz has been applied, (C) of FIG. 5 shows a state when a moment My has been applied, and (D) of FIG. 5 shows a state when an external force Mz has been applied.

If a three-dimensional orthogonal coordinate system 32 consisting of X, Y and Z axes is defined at the center point of the operating part 3 of the force sensor chip 1, a force Fx in the X-axis direction, force Fy in the Y-axis direction and force Fz in the Z-axis direction, and a rotating moment Mx applied to the X axis, rotating moment My applied to the Y axis and rotating moment Mz applied to the Z axis can be defined. Thus, even when deformation has been produced in the force sensor chip 1, formed using the semiconductor substrate 2 constructed in the above-described manner, due to an external force applied to the operating part 3, the applied external force can be separated into individual forces Fx, Fy and Fz and moments Mx, My and Mz, so that the force sensor chip 1 can effectively reduce an influence of interference among the axes (i.e., inter-axis interference). Namely, in order to prevent the inter-axis interference, a layout of the resistance elements on the force sensor chip 1 is selected and resistance change rate calculations are carried out in such a manner that resistance change rates based on forces or moments applied to the other axes than a particular axis can be canceled out.

The following paragraphs describe sensor characteristics with which force and moment components applied to the force sensor chip 1 are detected. When six axis components (i.e., axial forces) Fx[N], Fy[N], Fz[N], Mx[N·cm], My[N·cm] and Mz[N·cm] have been applied to the standalone force sensor chip 1, the following relationship is established between these six axis components and output detection signals on the basis of the behavior of the force sensor chip 1. Note that only the forces Fx and Fz and moments My and Mz are illustrated in (A)-(D) of FIG. 5.

Detection apparatus comprising external measurement equipment, which detects output signals from the force sensor chip 1, performs arithmetic operations on signals, representative of resistance change rates, obtained from the twelve strain resistance elements of the force sensor chip 1. Six resistance-change-rate signals Sig1, Sig2, Sig3, Sig4, Sig5 and Sig6 are ultimately output, as calculated resistance change rates, from the force sensor chip 1 following the arithmetic processing by the external measurement equipment. If values of the resistance change rates obtained from the twelve strain resistance elements Sxa1-Sxa3, Sya1-Sya3, Sxb1-Sxb3 and Syb1-Syb3, i.e. element outputs Vout explained above in relation to FIG. 6, are indicated as signals Sigd and signal change rates of the signals Sigd are indicated as R'Sxa1, R'Sxa2, R'Sxa3, R'Sya1, R'Sya2, R'Sya3, R'Sxb1, R'Sxb2, R'Sxb3, R'Syb1, R'Syb2 and R'Syb3, the above-mentioned six resistance-change-rate signals Sig1-Sig6 are determined on the basis of mathematical expressions (1)-(6) in relation to (A)-(D) of FIG. 5.

The external detection apparatus measures a resistance value of each of the resistance elements on the basis of current-voltage characteristics of the resistance element, and it determines a resistance value change rate, responsive to an external force, of each of the resistance elements. The resistance value of each of the resistance elements has the characteristic that it changes in response to strain produced in the semiconductor substrate 2.

At the time of application of the axial force Fx as shown in (A) of FIG. 5, the resistance elements Sya1, Sya3, Syb1, Syb3 detect strain, and the resistance-change-rate signal Sig1 is determined as $$Sig1(\approx Fx) = ((R'Sya1 - R'Sya3) + (R'Syb3 - R'Syb1))/4 \qquad (1)$$

In (A) of FIG. 5, the aforementioned resistance elements Sya1, Sya3, Syb1, Syb3 detecting the strain are shown as enclosed in two elongated circles. Further, in the figure, a "+" mark indicates that a resistance-increasing tensile force is acting on the resistance elements due to application of an external force, while a "−" mark indicates that a resistance-decreasing compressive force is acting on the resistance elements due to application of an external force. The same explanation applies to (B)-(D) of FIG. 5 and FIG. 6.

Similarly, at the time of application of the axial force Fy, the resistance elements Sxa1, Sxa3, Sxb1, Sxb3 detect strain, and the resistance-change-rate signal Sig2 is determined as $$Sig2(\approx Fy) = ((R'Sxa1 - R'Sxa3) + (R'Sxb3 - R'Sxb1))/4 \qquad (2)$$

Further, at the time of application of the axial force Fz as shown in (B) of FIG. 5, all of the resistance elements Sxa1-Sxa3, Sya1-Sya3, Sxb1-Sxb3 and Syb1-Syb3, and the resistance-change-rate signal Sig3 is determined as $$Sig3(\approx Fz) = ((R'Sxa1 - R'Sxa2) + (R'Sya1 - R'Sya2) + (R'Sxb1 - R'Sxb2) + (R'Syb1 - R'Syb2))/8 \qquad (3)$$

FIG. 6 shows an example of deformation of the semiconductor substrate 2 due to application of the axial force Fz.

Further, at the time of application of the moment My as shown in (C) of FIG. 5, the resistance elements Sxa1, Sxa3, Sxb1, Sxb3 detect strain, and the resistance-change-rate signal Sig4 is determined as $$Sig4(\approx Mx) = ((R'Sxa1 + R'Sxa3) - (R'Sxb1 + R'Sxb3))/4 \qquad (4)$$

Similarly, at the time of application of the moment Mx, the resistance elements Sya1, Sya3, Syb1, Syb3 detect strain, and the resistance-change-rate signal Sig5 is determined as $$Sig5(\approx My) = ((R'Sya1 + R'Sya3) - (R'Syb1 + R'Syb3))/4 \qquad (5)$$

Furthermore, at the time of application of the moment Mz as shown in (D) of FIG. 5, the resistance elements Sxa1, Sxa3, Sxb1, Sxb3, Sya1, Sya3, Syb1, Syb3 detect strain, and the resistance-change-rate signal Sig6 is determined as $$Sig6(\approx Mz) = ((R'Sxa3 - R'Sxa1) + (R'Sya3 - R'Sya1) + (R'Sxb3 - R'Sxb1) + (R'Syb3 - R'Syb1))/8 \qquad (6)$$

The six output signals Sig1-Sig6 of the force sensor determined in accordance with mathematical expressions (1)-(6) above and the six axial forces Fx, Fy, Fz, Mx, My, Mz applied to the sensor chip 1 can be interrelated by a particular matrix table, if output signals of the six-axis force sensor responsive to specific axial forces are obtained and relationship between the output signals and the applied axial forces is obtained experimentally. One example of such a particular matrix table is disclosed in Japanese Patent Application No. 2002-5334 filed by the same assignee as in the instant application (and then laid open as Japanese Patent Laid-Open Publication No. 2003-207405 that was discussed earlier in this specification).

In the particular matrix table, resistance elements are selected so that non-diagonal components of the matrix are each "0" or smaller value than diagonal components. Namely, mathematical expressions (1)-(6) above are formulated so that resistance elements are selected and resistance change rate calculation is performed in such a manner that resistance change rates of forces and moments of the individual axes cancel out one another.

The six axial forces Fx, Fy, Fz, Mx, My, Mz can be determined by multiplying the above-mentioned output signals Sig1-Sig6, obtained via the six-axis force sensor, by the matrix given by the matrix table.

As set forth above, the instant embodiment of the force sensor chip 1 can calculate all of the applied axial forces Fx, Fy, Fz, Mx, My, Mz on the basis of the element outputs (resistance change values) of different polarities, and thus, it can effectively reduce drift noise. Further, because the elements are laid out on one surface of the force sensor chip 1, the processing for fabricating the semiconductor substrate 2 of the force sensor chip 1 can be significantly simplified, and the force sensor chip 1 can be implemented with utmost ease.

In the above-described embodiment, the number and positions of the strain resistance elements and the shapes of the holes, operating part, connecting part, supporting part, etc. may be modified as desired on condition that the following requirement is met.

Namely, the requirement is that the number and positions of the strain resistance elements and the shapes of the connecting part etc. are determined such that all of the applied axial forces Fx, Fy, Fz, Mx, My, Mz can be calculated on the basis of the element outputs (resistance change values) of different polarities.

For example, the operating part 3, first annular intermediate section 5A disposed around the operating part 3 and second annular intermediate section 5B disposed around the annular intermediate section 5A can be modified into a square shape, octagonal shape or the like by forming the above-mentioned holes 1A-1D, 2A-2D and 3A-3D into linear shapes and changing the formed positions of the holes 1A-1D, 2A-2D and 3A-3D.

Figure 7:
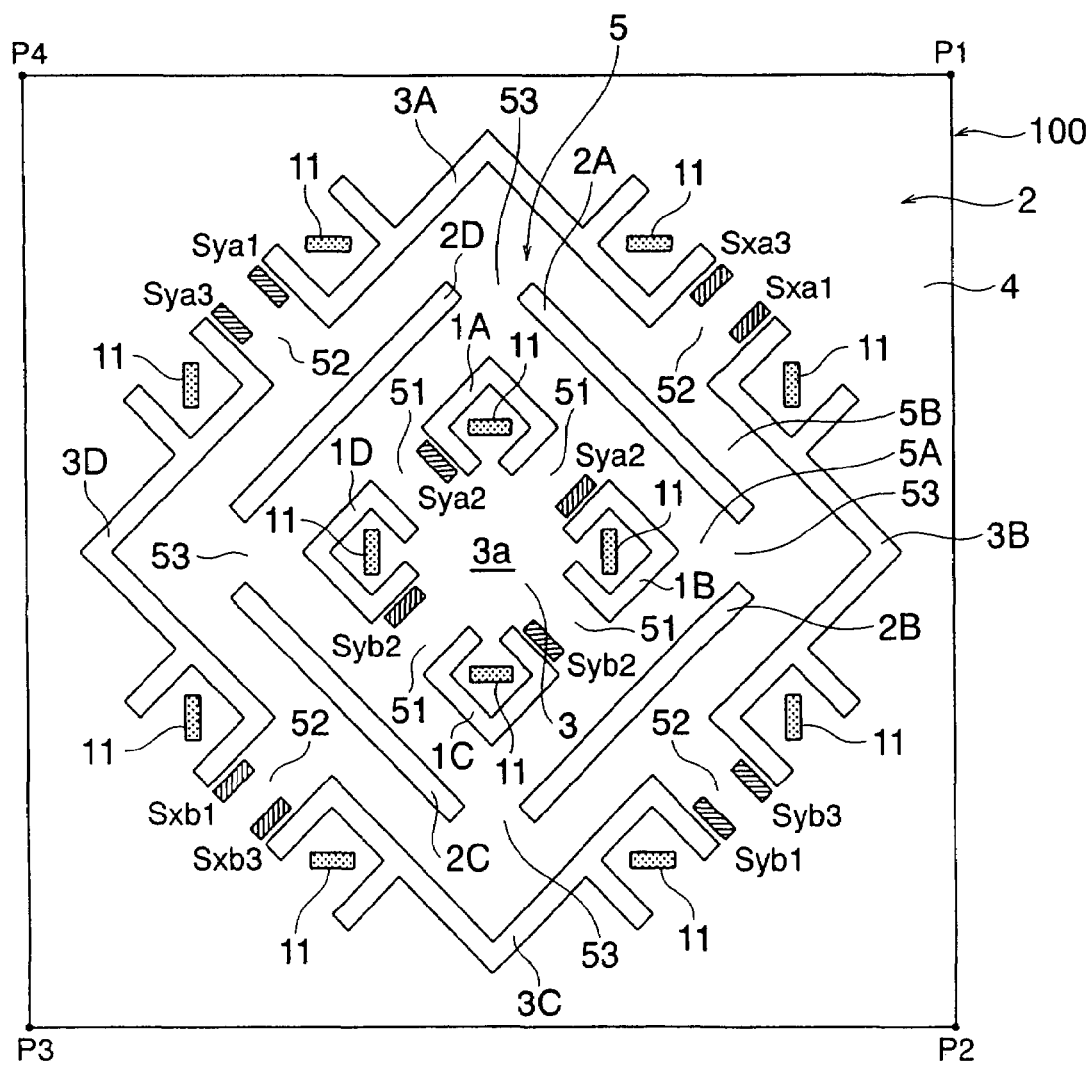
FIG. 7 is a plan view of another embodiment of the force sensor chip.

FIG. 7 is a plan view of another embodiment of the force sensor chip 100 where the holes 1A-1D, 2A-2D and 3A-3D are formed into linear shapes and the operating part 3, first annular intermediate section 5A disposed around the operating part 3 and second annular intermediate section 5B disposed around the first annular intermediate section 5A are formed into substantially square shapes. In FIG. 7, substantially the same elements as those already described above in relation to the force sensor chip 1 of FIG. 1 are indicated by the same reference characters and will not be described to avoid unnecessary duplication. In this force sensor chip 100 too, slit-like holes 1A-1D, 2A-2D and 3A-3D, operating part 3, supporting part 4, connecting part 5, first and second annular intermediate sections 5A and 5B, four first connecting arm sections 51, four second connecting arm sections 51 and four third connecting arm sections 53, comprising linear and bent corner portions, are formed in and on the semiconductor substrate 2.

It should be appreciated that various constructions, shapes, sizes, positions, etc. explained above in relation to the preferred embodiments are just for illustrative purposes, and that the present invention is not limited to the embodiments described above and may be modified variously without departing from the scope indicated by the appended claims.

The force sensor chip of the present invention can significantly reduce drift noise by its novel sensor construction and element layout and thus is very suited for high-precision detection of forces and moments.

Obviously, various minor changes and modifications of the present invention are possible in light of the above teaching. It is therefore to be understood that within the scope of the appended claims the invention may be practiced otherwise than as specifically described.

What is claimed is:

1. A force sensor chip comprising:
    a base member to which an external force is applied, said base member including:
        an operating part provided in a central portion of said base member and having an external-force acting area section;
        a supporting part provided, in an outer peripheral portion of said base member, for supporting said operating part;
        an intermediate part provided from near between an outer periphery of said operating part and an inner peripheral portion of said supporting part;
        a first connecting arm section connecting said operating part and said intermediate part; and
        a second connecting arm section connecting said intermediate part and said supporting part; and
    at least one strain resistance element provided on each of respective deformation-generating portions of said first connecting arm section and said second connecting arm section,
    wherein the base member further comprises a first set of elongated holes forming an innermost substantially annular hole between the operating part and the intermediate part, and a second set of elongated holes forming an outermost substantially annular hole between the intermediate part and the supporting part, and
    wherein the first connecting arm section is disposed between adjacent elongated holes of the first set of elongated holes and the second connecting arm section is disposed between adjacent elongated holes of the second set of elongated holes.

2. The force sensor chip of claim 1, wherein said intermediate part includes first and second intermediate sections interconnected via a third connecting arm section, and wherein said first intermediate section is connected to said operating part via said first connecting arm section and said second intermediate section is connected to said supporting part via said second connecting arm section.

3. The force sensor chip of claim 1, wherein said strain resistance element, the first and second connecting arm sections and said intermediate part are formed in quadruple symmetry about a center of said base member.

4. The force sensor chip of claim 1, wherein said operating part and said supporting part include respective non-deforming area sections, and a temperature compensating resistance element is provided on each of the non-deforming area sections in correspondence to the strain resistance element located near the non-deforming area sections.

5. The force sensor chip of claim 1, wherein four said first connecting arm sections and four said second connecting arm sections are provided on diagonal lines of said base member.

6. The force sensor chip of claim 1, wherein said base member is a semiconductor substrate.

7. The force sensor chip of claim 1, wherein the base member further comprises at least a third set of elongated holes forming an intermediate substantially annular hole between the innermost and outermost annular holes.

8. The force sensor chip of claim 7, wherein the first, second and third sets of elongated holes are positioned in concentric relation to one another.

9. The force sensor chip of claim 8, wherein the first and second sets of elongated holes are formed in corresponding angular positions along their respective circumferential directions.

10. The force sensor chip of claim 9, wherein the third set of elongated holes are formed in angular positions disposed circumferentially by about 45 degrees from the first and second sets of elongated holes.

11. The force sensor chip of claim 10, wherein the at least one strain resistance element includes eight strain resistance elements formed in the second connecting arm section between the adjacent elongated holes of the second set of elongated holes, and four strain resistance elements formed in the first connecting arm section between the adjacent elongated holes of the first set of elongated holes.

12. The force sensor chip of claim 1, wherein the first connecting arm section includes four first connecting arm sections with one strain resistance element formed in each of the four first connecting arm sections.

13. The force sensor chip of claim 12, wherein the operating part provided in the central portion of said base member further has four non-deforming area sections disposed around the external force acting area section, and four temperature compensation elements each provided in respective one of the non-deforming area sections.

14. The force sensor chip of claim 13, wherein each of the four temperature compensating elements is correspondingly disposed near one of the four strain resistance elements formed in the respective first connecting arm sections.

15. The force sensor chip of claim 1, wherein the second connecting arm section includes four second connecting arm sections with two strain resistance elements formed in each of the four second connecting arm sections.

16. The force sensor chip of claim 15, wherein the supporting part has eight non-deforming area sections each including one temperature compensation elements disposed therein.

17. The force sensor chip of claim 16, wherein the two of the eight temperature compensation elements are correspondingly disposed near the two strain resistance elements formed in each of the four second connecting arm sections.

* * * * *